US012782581B2

(12) United States Patent
Nicolas et al.

(10) Patent No.: US 12,782,581 B2
(45) Date of Patent: Nov. 3, 2026

(54) METHOD AND SYSTEM FOR DETECTING OBSTACLES WITH AN OBSTACLE SENSOR FOR A ROTARY-WING AIRCRAFT

(71) Applicant: AIRBUS HELICOPTERS, Marignane Cedex (FR)

(72) Inventors: Dorothee Nicolas, Toulouse (FR); Frederick Gianni, Toulouse (FR); Nicolas Damiani, Marseilles (FR)

(73) Assignee: AIRBUS HELICOPTERS, Marignane Cedex (FR)

( * ) Notice: Subject to any disclaimer, the term of this patent is extended or adjusted under 35 U.S.C. 154(b) by 439 days.

(21) Appl. No.: 18/509,607

(22) Filed: Nov. 15, 2023

(65) Prior Publication Data

US 2024/0201390 A1 Jun. 20, 2024

(30) Foreign Application Priority Data

Dec. 19, 2022 (FR) ....................................... 2213799

(51) Int. Cl.
*G01S 17/933* (2020.01)
*B64D 45/08* (2006.01)
(Continued)

(52) U.S. Cl.
CPC ............ *G01S 17/933* (2013.01); *B64D 45/08* (2013.01); *G01S 7/4815* (2013.01); *G01S 17/89* (2013.01);
(Continued)

(58) Field of Classification Search
CPC ........... G06T 15/00; G06T 7/70; G06T 17/05; G06T 2207/30261; B64D 45/08;
(Continued)

(56) References Cited

U.S. PATENT DOCUMENTS 7,675,461 B1 3/2010 McCusker et al.
9,583,011 B2 * 2/2017 Ott ....................... G01C 21/005
(Continued)

FOREIGN PATENT DOCUMENTS

EP 3236213 A2 10/2017
EP 3447750 B1 3/2021
(Continued)

OTHER PUBLICATIONS

French Search Report forFrench Application No. FR2213799, Completed by the French Patent Office, Dated Jul. 3, 2023, 9 pages.

*Primary Examiner* — An H Do
(74) *Attorney, Agent, or Firm* — Brooks Kushman P.C.

(57) ABSTRACT

A method for signaling obstacles present in a space surrounding an aircraft. This method includes acquiring, with at least one LiDAR obstacle sensor, positioning data in a reference frame of the obstacle sensor, constructing, during said flight, a three-dimensional map of the surrounding space in a mapping reference frame and positioning the aircraft in the map by applying a simultaneous localization and mapping process based at least on the positioning data, and displaying, during the flight, on a display, an aircraft symbol and a two-dimensional representation of at least a part of the map, each point displayed in the representation being displayed according to a graphic charter taking the associated level of risk into consideration.

20 Claims, 4 Drawing Sheets

(51) Int. Cl.

| | |
|---|---|
| ***G01S 7/481*** | (2006.01) |
| ***G01S 17/89*** | (2020.01) |
| ***G06T 7/70*** | (2017.01) |
| ***G06T 15/00*** | (2011.01) |
| ***G06T 17/05*** | (2011.01) |
| ***G08G 5/21*** | (2025.01) |
| ***G08G 5/74*** | (2025.01) |
| ***G08G 5/80*** | (2025.01) |

(52) U.S. Cl.
CPC ................ *G06T 7/70* (2017.01); *G06T 15/00* (2013.01); *G06T 17/05* (2013.01); *G08G 5/21* (2025.01); *G08G 5/74* (2025.01); *G08G 5/80* (2025.01); *G06T 2207/30261* (2013.01)

(58) Field of Classification Search
CPC ... G08G 5/74; G08G 5/21; G08G 5/80; G01S 17/933; G01S 7/4815; G01S 17/89
See application file for complete search history.

(56) References Cited

U.S. PATENT DOCUMENTS

| | | | | |
|---|---|---|---|---|
| 10,062,293 | B2 * | 8/2018 | Nikolajevic ............. | G08G 5/80 |
| 11,862,030 | B2 * | 1/2024 | Damiani .................. | G08G 5/80 |
| 2013/0282208 | A1 | 10/2013 | Mendez-Rodriguez et al. | |
| 2017/0323571 | A1 | 11/2017 | Lissajoux et al. | |
| 2019/0094538 | A1 | 3/2019 | Dumas et al. | |
| 2022/0172631 | A1 | 6/2022 | Damiani | |

FOREIGN PATENT DOCUMENTS

| | | | |
|---|---|---|---|
| EP | 4009070 | A1 | 6/2022 |
| FR | 3022357 | A1 | 12/2015 |
| FR | 3071624 | A1 | 3/2019 |
| FR | 3116906 | A1 | 6/2022 |

* cited by examiner

METHOD AND SYSTEM FOR DETECTING OBSTACLES WITH AN OBSTACLE SENSOR FOR A ROTARY-WING AIRCRAFT

CROSS-REFERENCE TO RELATED APPLICATIONS

This application claims priority to French patent application No. FR 22 13799 filed on Dec. 19, 2022, the disclosure of which is incorporated in its entirety by reference herein.

TECHNICAL FIELD

The present disclosure relates to a method and a system for detecting obstacles with an obstacle sensor for a rotary-wing aircraft.

BACKGROUND

An aircraft may comprise one or more systems for preventing a collision, during flight, with the terrain or an object distinct from the terrain, such as a building, a pylon, a cable, a crane or the like. The term "obstacle" used hereinafter refers to any feature that is liable to collide with an aircraft, the term obstacle covering not only the terrain but also any object distinct from the terrain that is liable to come into contact with an aircraft.

A system referred to as a Ground Proximity Warning System or GPWS can be used to alert the aircraft pilot to the proximity of the ground.

Piloting assistance systems are known as Terrain Avoidance Warning Systems or TAWS.

A TAWS can be used to indicate known obstacles that are situated ahead of the aircraft's trajectory as they approach. A TAWS may in particular comprise an obstacle avoidance function referred to as Forward-Looking Terrain Avoidance or FLTA. Owing to the specific characteristics of rotary-wing aircraft, impact warning and alert systems have been designed for these rotary-wing aircraft and are known as Helicopter Terrain Avoidance Warning Systems or HTAWS. The acronym TAWS is used hereinafter to denote both a TAWS and an HTAWS.

A TAWS may therefore comprise a device for localizing the aircraft in the airspace, an obstacle database listing known obstacles, i.e., the terrain, and indeed known objects other than the terrain. Therefore, the TAWS may have a display that represents, in two dimensions, the known obstacles listed in the obstacle database and situated in the vicinity of the aircraft. The TAWS may also generate an alert if the aircraft is in danger of colliding with an obstacle. Such a TAWS may be described as "passive" insofar as this system uses an existing obstacle database.

Such a TAWS is advantageous but requires an obstacle database and a system for localizing the aircraft in the airspace. The obstacle database lists known obstacles, and therefore does not take into account moving or newly appeared obstacles, such as a crane, for example. The terrain recorded in an obstacle database may also be located in an approximate manner due to the degree of accuracy of the obstacle database, for example of the order of 40 meters or more. This inaccuracy is compounded by the inaccuracy of the localization system. These limitations are nevertheless acceptable when the TAWS is being used, in particular, in a cruising phase.

However, a TAWS may not be suitable for missions carried out with a rotary-wing aircraft in the immediate vicinity of an obstacle, for example during a mountain rescue mission. When flying close to the terrain, some pilots may even tend to temporarily deactivate the TAWS in order to avoid setting off multiple alarms.

For such missions, a rotary-wing aircraft may comprise another system known as a Rotor Strike Avoiding System or RSAS. An RSAS may comprise an active obstacle sensing device configured to detect one or more obstacles during flight in order to prevent a collision with the rotary wing, and a display showing the detected obstacles. The obstacle sensing device may comprise one or more LIght Detection And Ranging or LiDAR obstacle sensors. A LiDAR system is provided with a beam emitter that emits pulses of light in a narrow-aperture detection field.

Although effective, only the obstacles that are present in the detection field are detected and therefore displayed. The obstacles present below or above this detection field, or indeed in the extension of the detection field, are not detected and shown on a display. This system is sufficient in the short term to prevent a collision, for example between a rotary wing and a rock face, but does not provide indications about the rest of the environment for the remainder of the mission. Therefore, a pilot may, for example, fly to a mountain rescue zone, passing under a cable that is in his or her field of view when approaching the rescue zone; carry out the mission close to the mountain in complete safety, owing to the RSAS; and head back towards base forgetting about the presence of the cable that was seen on the approach but that is not in his or her field of view and the detection zone of the RSAS when gaining altitude again, moving away from the rock face.

Furthermore, an obstacle sensing device may detect many obstacle points. The display showing these obstacle points may then be saturated. It may therefore be difficult for a pilot to analyze the displayed data objectively and quickly, alongside the other tasks that need to be performed. By way of example, a LiDAR sensing device may detect several tens or indeed hundreds of thousands of points during each operating cycle.

In summary, a passive TAWS can use an onboard database to signal, take into consideration and avoid known obstacles with medium accuracy and at a long distance during a cruising phase, whereas an active short-distance RSAS collision avoidance system can implement an active obstacle sensor. These two systems are therefore different and have different functions, and can therefore be complementary.

In this context, document FR 3 116 906 A1 describes an aircraft provided with an obstacle detection system comprising an obstacle sensing device and a display. This obstacle sensing device scans the surrounding space. A display displays only a representation of the obstacle points situated inside a band of the airspace. Therefore, this document FR 3 116 906 A1 suggests filtering the detected obstacle points so as to display only the obstacle points present in a particular volume in order to make the information displayed intelligible and facilitate the work of a pilot.

Document EP 3 236 213 describes a display system receiving data from a plurality of sensors, a navigation platform and a database in order to display a three-dimensional illustration of a region surrounding an aircraft: each danger is displayed in a color corresponding to how critical it is. The database may be updated by performing a flight with a LiDAR sensing device.

Document EP 3 447 750 B1 describes a method and a system for validating a flight path for an aircraft.

Document US 2013/0282208 is far removed from the problem of detecting obstacles and describes a method for selecting a landing area. This method comprises receiving point cloud data from a LiDAR system as sequential image frames, selecting a land area in each image frame, carrying out a first filtering operation on the land area to select a landing area, and carrying out a second filtering operation on the area to select a safe landing area.

Document EP 4 009 070 relates to a method and a system for detecting obstacles situated around an aircraft with an obstacle sensing device. After examining the space surrounding the aircraft with an obstacle sensing device, for example a LiDAR sensing device, positioning data relating to a plurality of obstacles are generated. Next, each obstacle situated within a detection volume limited in altitude is considered to be a relevant point and is displayed as such on a display. The detection volume extends between a high plane and a low plane respectively situated above and below the aircraft. Moreover, the obstacles may be displayed in different colors depending on their nature.

Documents U.S. Pat. No. 7,675,461 B1, FR 3 071 624 and FR 3 022 357 are also known.

SUMMARY

An object of the present disclosure is thus to propose an effective method for detecting both known and unknown obstacles, and for signaling the obstacles to a crew member in an intelligible manner.

The disclosure therefore relates to a signaling method for signaling, in an aircraft having at least one rotary wing, obstacles present in a surrounding space situated outside the aircraft.

The signaling method comprises an initialization comprising an in-flight determination of a mapping reference frame provided with a vertical axis in the terrestrial reference frame, and a series of operating cycles, each operating cycle comprising:

- acquiring, with at least one LiDAR obstacle sensor, positioning data in a reference frame of the obstacle sensor, each positioning data relating to a position of an obstacle point present on an obstacle in the surrounding space in relation to the obstacle sensor;
- possibly following this acquisition, constructing, during said flight, a three-dimensional map of said surrounding space, and positioning said aircraft in said map, by applying a simultaneous localization and mapping process based at least on said positioning data, said map being generated in the mapping reference frame; and
- displaying, during said flight, on a display of the aircraft, an aircraft symbol showing said aircraft and a two-dimensional representation, restricted to the display, of at least a part of said map containing the aircraft and unlimited in altitude, each point displayed in said representation being associated with a level of risk that varies as a function of a relative altitude between an obstacle of said surrounding space associated with this displayed point and the aircraft, each displayed point of said representation being displayed according to a graphic charter taking the associated level of risk into consideration.

The expression "two-dimensional representation, restricted to the display, of at least a part of said map containing the aircraft and unlimited in altitude" means that all of the points or groups of points of the map that are present in a part of the map are displayed by default, provided that they can appear on the display as a result of the scale factor between the display and the outside world and irrespective of their altitude. The part of the map shown on the display by default is a view of the map containing all the points or groups of points present at certain horizontal coordinates of the mapping reference frame, and therefore regardless of the vertical coordinates of these points.

Each obstacle point detected during an operating cycle is positioned in the reference frame of the obstacle sensor and then in the mapping reference frame. As a result, the signaling method allows the surrounding space to be mapped during a flight in order to tend to detect the obstacles presents in an area. This signaling method therefore makes it possible to take all the detectable obstacles into consideration, and not only the obstacles known on a certain date and referenced in an onboard database, as in earlier TAWS's, or only the obstacles detected in an annular field during an acquisition cycle when using RSAS's. According to the previous example, if a cable has been detected and added to the map during an aircraft's descent to a mountain rescue zone, the display will show an illustration of the cable when the aircraft departs again at the end of its mission.

In addition, the signaling method comprises a display step for making the displayed information legible. The graphic charter applied consists in displaying each point, referred to as a "displayed point", of the representation of the map constructed during flight, with a color that carries the risk presented to the aircraft by the corresponding obstacle. A displayed point may be a pixel of the image displayed on the display. A pilot can therefore easily deduce, by looking at the display, where the obstacles are located in relation to the aircraft. For example, the obstacles situated at substantially the same altitude as the aircraft and above it are displayed according to the graphic code associated with the highest level of risk. The obstacles situated below the aircraft are also shown, but according to one or more graphic codes associated with one or more lower respective levels of risk.

The signaling method may further comprise one or more of the following features, taken individually or in combination.

According to one possibility, the in-flight determination of a mapping reference frame may comprise determining, during flight, a current roll angle and a current pitch angle of the aircraft, and determining the mapping reference frame as a function of the reference frame of the obstacle sensor and the current roll angle and the current pitch angle, or indeed a stored mathematical model taking into account the reference frame of the obstacle sensor and the current roll angle and the current pitch angle.

When the signaling method is initialized, the mapping reference frame may be obtained from the reference frame of the obstacle sensor "horizontalized". The reference frame of the obstacle sensor is thus tilted about the roll axis of the aircraft by a value equal to the current roll angle, and about the pitch axis of the aircraft by a value equal to the current pitch angle, these values being measured by a conventional sensing device such as an inertial unit, for example.

Alternatively, the in-flight determination of a mapping reference frame may comprise, during flight, positioning the aircraft in a predetermined attitude, then positioning the mapping reference frame as a function of a current position of the reference frame of the obstacle sensor and a stored model by operating a human-machine selection interface.

For example, a pilot positions the aircraft in a predetermined attitude wherein an axis of the reference frame of the obstacle sensor is vertical in the terrestrial reference frame, and two axes of the reference frame of the obstacle sensor are horizontal in the terrestrial reference frame. After the human-machine selection interface has been operated, the three axes of the reference frame of the obstacle sensor are considered to be located at the current position of the three corresponding axes of the mapping reference frame. The stored model therefore consists, in this example, of superimposing the reference frame of the obstacle sensor and the mapping reference frame.

According to another example, a pilot positions the aircraft in a predetermined attitude, for example with a particular pitch angle different from zero. After the human-machine selection interface has been operated, the three axes of the reference frame of the obstacle sensor are considered to be located in a position predetermined by the stored model in relation to the current position of the three corresponding axes of the mapping reference frame. For example, the stored model then consists of tilting the reference frame of the obstacle sensor by a predetermined pitch angle.

According to one possibility compatible with the preceding possibilities, said map may be divided into several contiguous bands that are each horizontal in the terrestrial reference frame and associated with a level of risk, each point displayed in said representation associated with an obstacle present in one of the bands being visually displayed according to a graphic code specific to this band.

The term “band” denotes a layer of the map delimited by two horizontal planes in the terrestrial reference frame, or all of the space situated above or below such a horizontal plane. Therefore, the band of the map wherein the current position of the aircraft is located may be positioned between two horizontal planes or may comprise all of the space situated above a reference plane, at least one other band comprising all of the space of the map situated between two horizontal planes in the terrestrial reference frame. A final band may comprise all of the space situated below a horizontal plane. Two adjacent bands are separated by a shared horizontal plane.

The map is cut virtually into several horizontal bands. The graphic code associated with a horizontal band is different from each of the other graphic codes so that a pilot can easily identify the risk of the detected obstacles depending on the band wherein they are positioned.

At least one band may possibly extend between two parallel planes separated by a distance that varies as a function of a speed vector of the aircraft.

The thicknesses of the bands defining the levels of risk may be determined at each operating cycle during flight depending on the forward speed of the aircraft. Indeed, the risk presented by an obstacle situated at a certain vertical distance from the aircraft may by higher or lower depending on the speed vector of the aircraft.

According to one possibility compatible with the preceding possibilities, said level of risk associated with a displayed point of the representation may be at a maximum when this displayed point represents an obstacle present in a first band of the map that is horizontal in the terrestrial reference frame and contains the aircraft, i.e., contains the current position of the aircraft, this displayed point being visually different from any displayed point having a level of risk different from the maximum level of risk.

Therefore, the obstacles situated at substantially the same altitude as the aircraft and at a higher altitude than the aircraft are considered to be the most dangerous and are displayed in a particular manner in order to distinguish them from the other obstacles.

The thickness of this band is therefore theoretically infinite but is practically limited due to the maximum flight altitude and the maximum range of the LiDAR.

Alternatively, the first band may for example be capped at the maximum flight altitude of the aircraft.

According to one possibility compatible with the preceding possibilities, said level of risk associated with a displayed point of the representation may be high when this displayed point represents an obstacle present in a second band of the map that is horizontal in the terrestrial reference frame and adjacent beneath the first band, the high level of risk being lower than the maximum level of risk, each displayed point associated with a maximum level of risk being visually different from each displayed point associated with a high level of risk.

The obstacles situated directly beneath the first horizontal band are then considered to be less dangerous than the obstacles present in the first horizontal band. However, these obstacles situated directly beneath the first horizontal band are displayed so that the pilot can see the whole environment.

According to one possibility compatible with the preceding possibilities, (i) said level of risk associated with a displayed point of the representation is medium when this displayed point represents an obstacle present in a third band of the map that is horizontal in the terrestrial reference frame and adjacent beneath the second band, the medium level of risk being lower than the high level of risk, each displayed point associated with a medium level of risk being visually different from each displayed point associated with a high level of risk and a maximum level of risk; and (ii) said level of risk associated with a displayed point of the representation being low when this point represents an obstacle present in a fourth band of the map that is horizontal in the terrestrial reference frame and adjacent beneath the third band, the low level of risk being lower than the medium level of risk, each displayed point associated with a low level of risk being visually different from each displayed point associated with a maximum, high and medium level of risk.

According to one possibility compatible with the preceding possibilities, if a displayed point of the representation corresponds to at least two different obstacle points respectively associated with two different levels of risk, this displayed point has the highest level of risk of the levels of risk of the associated obstacle points.

A given displayed point may correspond to several different obstacle points. In this case, the displayed point is displayed according to the graphic code associated with the obstacle that presents the most danger to the aircraft.

According to one possibility compatible with the preceding possibilities, said signaling method may comprise deleting each point of the map situated at a distance from the aircraft greater than a predetermined threshold.

This feature makes it possible, for example, to limit the processing time or prevent too many inaccuracies from accumulating in the constructed map.

According to one possibility compatible with the preceding possibilities, said representation may comprise a view according to a horizontal display plane in the terrestrial reference frame, such as a view referred to as a top view by a person skilled in the art, showing each obstacle point of the surrounding space restricted to the display.

The representation is in this case established as a function of all of the obstacle points. The representation may result from the orthogonal projection of each point or group of points of the map on the horizontal display plane.

According to one possibility compatible with the preceding possibilities, said representation may comprise a view according to a vertical display plane in the terrestrial reference frame, such as a view referred to as a side, front or rear view by a person skilled in the art, showing each obstacle point present in a section of the surrounding space centered on the aircraft, of a predetermined width and restricted to the display. The section is delimited between two vertical planes in the terrestrial reference frame.

According to one possibility compatible with the preceding possibilities, said representation may comprise front, rear or side views of a part of the map that lies between two predetermined parallel and vertical planes. If the view is a side view, the two vertical planes delimiting the section are substantially parallel to the longitudinal axis of the aircraft, i.e., the roll axis of the aircraft. If the view is a front or rear view, the two vertical planes delimiting the section are substantially parallel to the transverse axis of the aircraft, i.e., the pitch axis of the aircraft. The position of these vertical planes delimiting the section is predetermined and defined relative to the position of the aircraft. These views are projected orthogonally onto a vertical display plane in the terrestrial reference frame of the points of the map. The representation may result from the projection of each obstacle point present in the corridor formed by this section on the vertical display plane in question.

Limiting the display to the obstacles between two vertical planes constitutes a filter. The advantage of this filter is clear because, when it is absent, the display could transmit information that would be difficult to make use of. For example, a particular obstacle may be in front of the aircraft, outside the corridor delimited by the two predetermined vertical planes, and at an altitude associated with a high level of risk. If all of the obstacle points are taken into account, the representation of the surrounding space seen from the rear will include a displayed point signaling a maximum risk for this particular obstacle. Conversely, with the filter described above, the representation will not signal the abovementioned particular obstacle because it is outside the associated corridor. A pilot will therefore have a representation of the immediate environment that enables him or her to understand where potentially threatening obstacles are located.

The method may possibly comprise selecting the view to be displayed, with a suitable interface, from the view according to a horizontal display plane and at least one view according to a vertical display plane.

According to one possibility compatible with the preceding possibilities, said method may comprise generating an inhibition order to inhibit each displayed point associated with a chosen level of risk, and inhibiting the display of the displayed points associated with the chosen level of risk.

By default, all of the points of the part of the map to be displayed are represented on the display. A pilot may possibly maneuver a human-machine selection interface to display only information relative to the obstacles that present the chosen level of risk, for example so that the display only shows the obstacles that present a maximum risk to the aircraft.

According to another aspect, the “simultaneous localization and mapping” process comprises implementing an odometry estimation algorithm. The odometry estimation algorithm makes it possible to determine, at each operating cycle, at least one translation-rotation transform between a cloud of obstacle points and another point cloud or points of a map. The odometry estimation algorithm uses an iterative method that minimizes the difference in distance between obstacle points detected during the current operating cycle and either points resulting from the previous acquisition or points extracted from the current map. The transform or transforms are in particular used to update the map at each operating cycle and determine the current position of the aircraft in this map.

According to one possibility compatible with the preceding possibilities, during a first operating cycle of said series of operating cycles, said “simultaneous localization and mapping” process is configured to use, in an odometry estimation algorithm, at least one piece of inertial data.

At least one piece of inertial data is then taken into account to produce a first estimate of the translation-rotation transform.

For example, the roll, pitch and yaw angles and the roll, pitch and yaw angular speeds and accelerations are used to construct the first estimate, and the calculation time and the convergence robustness of the odometry estimation algorithm are greatly improved.

During each subsequent operating cycle, the odometry estimation algorithm may only use a cloud of obstacle points resulting from a previous operating cycle and the cloud of obstacle points established during the current operating cycle in order to iteratively improve said translation-rotation transform. In other words, the odometry estimation algorithm no longer uses inertial data.

According to one possibility compatible with the preceding possibilities, if the cloud of obstacle points acquired during the first operating cycle comprises a number of obstacle points less than a stored threshold, an alert may be generated. The method is possibly automatically stopped and then restarted.

According to one possibility compatible with the preceding possibilities, the first operating cycle is carried out simultaneous to the in-flight determination of a mapping reference frame.

According to one possibility compatible with the preceding possibilities, said initialization may comprise displaying a predetermined background on the display, said aircraft symbol and said representation covering said background.

By default, the display may have a background having a color and/or a design that indicates that the region is indeterminate, for example a grey color. A pilot then knows that, in all of the areas displayed according to this graphic code, the surrounding space may contain obstacles. This situation may occur in areas not yet covered by the obstacle sensor.

According to one possibility compatible with the preceding possibilities, said signaling method may comprise, at each operating cycle, determining a confidence index relating to the simultaneous localization and mapping process, and generating an alert and/or a stop and/or a restart when this confidence index does not comply with a predetermined criterion.

For example, a first alert is issued when the convergence index is in a first range of values to signal that the method has an acceptable but medium level of accuracy.

For example, a second alert is issued when the convergence index is in a second range of values to signal that the method has an unacceptable level of accuracy. For example, the method is stopped and restarted automatically when the convergence index is in the second range of values.

The confidence index may thus make it possible, if necessary, to warn the crew of the aircraft that the accuracy and the robustness of the signaling method is deteriorating and that the information communicated via the display is therefore less reliable and accurate than in the nominal case.

According to one possibility, the confidence index may be calculated using at least one of the following factors: a stiffness of an inverse problem solved by an odometry estimation algorithm of the simultaneous localization and mapping process, a number of obstacle points detected during the current operating cycle that correspond to points of the map, i.e., the current map. The expression "obstacle points detected during the current operating cycle that correspond to points of the map" denotes points that are considered identical in a conventional manner by the simultaneous localization and mapping process.

The confidence index may be equal to one of the preceding factors or to a combination of the two factors, for example.

Indeed, the stiffness of the inverse problem solved by the odometry estimation algorithm of the simultaneous localization and mapping process may be determined in a conventional manner. A problem is said to be stiff if it is ill-conditioned in the sense of numerical analysis and, in particular, inverse problems. The stiffer the problem, the lower the confidence in the simultaneous localization and mapping process. The stiffness may therefore be compared to one or more stored stiffness ranges determined by tests or simulations, for example.

According to another possibility, the number of obstacle points detected during an operating cycle that correspond to points of the map that has already been produced may be a good confidence index. If this number is low, confidence in the simultaneous localization and mapping process is low. Thus, the number of obstacle points detected during an operating cycle that correspond to points of the map that has already been produced may be compared with one or more stored ranges of values determined by tests or simulations, for example.

For example, if the obstacle sensor scans a flat surface, the odometry estimation algorithm will not be able to align, with acceptable accuracy, the cloud of obstacle points established during the current operating cycle and the map that has already been produced, or will not even converge towards a solution. In this case, the confidence index becomes nonstandard and an alert is generated.

For example, the display displays an alert message instead of the aircraft symbol and the representation of the constructed map.

According to one possibility compatible with the preceding possibilities, if the aircraft has a forward speed, for example a ground speed, greater than a stored limit speed threshold, an alert may be generated. The signaling method is possibly stopped when the forward speed is greater than the stored limit speed threshold, then reinitialized when the forward speed falls back below the limit speed threshold.

The disclosure further relates to an approach method for guiding an aircraft towards a particular area of the airspace.

The approach method comprises carrying out a preliminary phase of flight over the particular area and applying the signaling method during this preliminary phase, then carrying out a descent phase towards the particular area and applying the signaling method during this descent phase.

A pilot may therefore pilot the aircraft to fly over and map the particular area, before descending to this particular area in a safe manner by monitoring the obstacles, using the display. The LiDAR obstacle sensor has a limited range, and obstacles such as a hill or a building may conceal the area of interest, meaning that a direct approach to the particular area does not always give a good understanding of the environment.

The disclosure further relates to a signaling system configured for an aircraft for mapping and signaling obstacles present in a surrounding space around an aircraft. This obstacle signaling system is configured to apply the signaling method.

The disclosure further relates to an aircraft having at least one rotary wing comprising such an obstacle signaling system.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
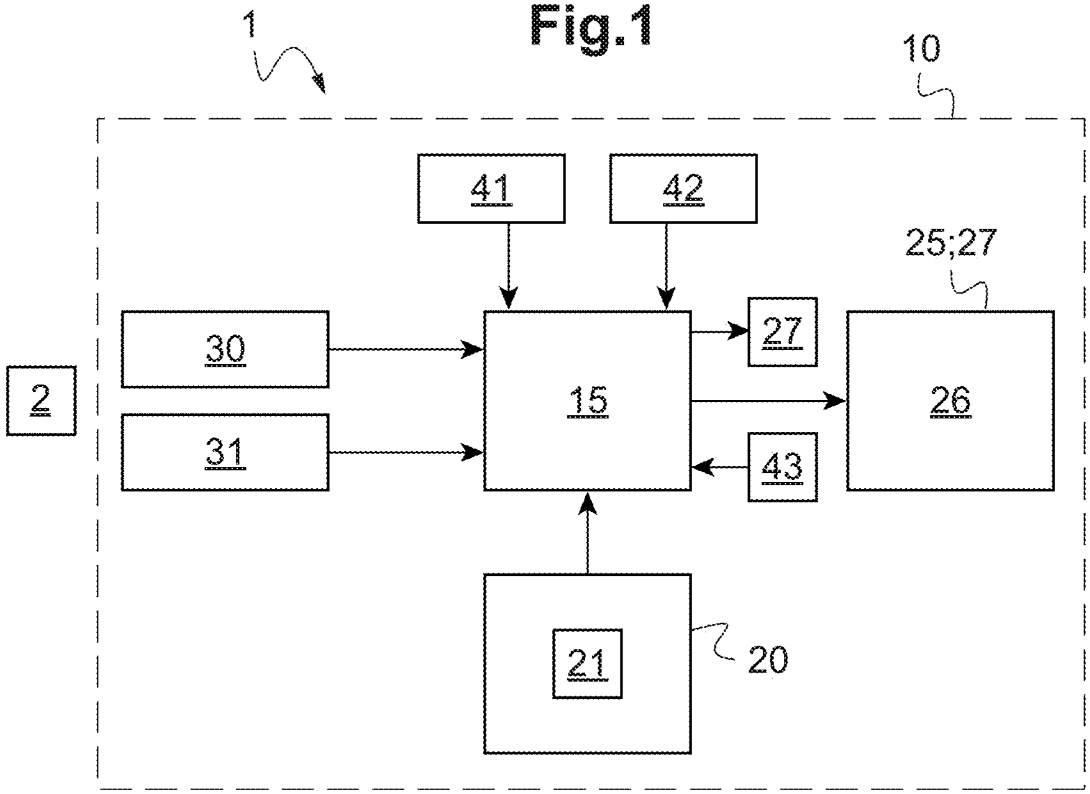
FIG. 1 is a diagram showing a signaling system according to the disclosure.

FIG. 1 shows an aircraft 1 suitable for implementing the methods of the disclosure. This aircraft 1 may comprise a rotary wing 2. This aircraft is liable to impact an obstacle when flying in its immediate vicinity.

Moreover, the aircraft 1 comprises a signaling system 10 configured to map and signal obstacles present in a surrounding space.

The signaling system 10 comprises an obstacle sensing device 20. This obstacle sensing device 20 may comprise an obstacle sensor 21 according to the example shown, or several obstacle sensors 21 possibly arranged in different regions of the aircraft 1.

The term "sensor" denotes a physical sensing device capable of directly measuring the parameter in question but also a system that may comprise one or more physical sensing devices as well as means for processing the signal that make it possible to provide an estimation of the parameter from the measurements provided by these physical sensing devices. Similarly, a measurement of a parameter may refer to a raw measurement from a physical sensing device or to a measurement obtained by relatively complex processing of raw measurement signals.

Such an obstacle sensor 21 comprises a LiDAR sensor that emits pulses of light. For this purpose, a LiDAR obstacle sensor 21 may comprise, for example, a plurality of LASER diodes.

For example, the aircraft 1 comprises a subfloor structure carrying a single obstacle sensor 21. This obstacle sensor 21 may, by way of illustration, be tilted by approximately 30 degrees with respect to the earth's horizontal when the aircraft 1 has a zero roll angle and a zero pitch angle. This obstacle sensor 21 may therefore be inclined downwards and towards the front of the aircraft 1.

The signaling system 10 comprises a controller 15 comprising at least one processing unit. Such a processing unit may, for example, comprise at least one processor and at least one memory, at least one integrated circuit, at least one programmable system, at least one logic circuit, these examples not limiting the scope given to the expression "processing unit". The term "processor" may refer equally to a central processing unit or CPU, a graphics processing unit or GPU, a digital signal processor or DSP, a microcontroller, etc.

The controller 15 is in communication with the obstacle sensing device 20. The controller 15 is therefore configured to construct and update a map of the surrounding space during flight, using data referred to as "positioning" data emitted by the obstacle sensor or sensors 21.

Figure 2:
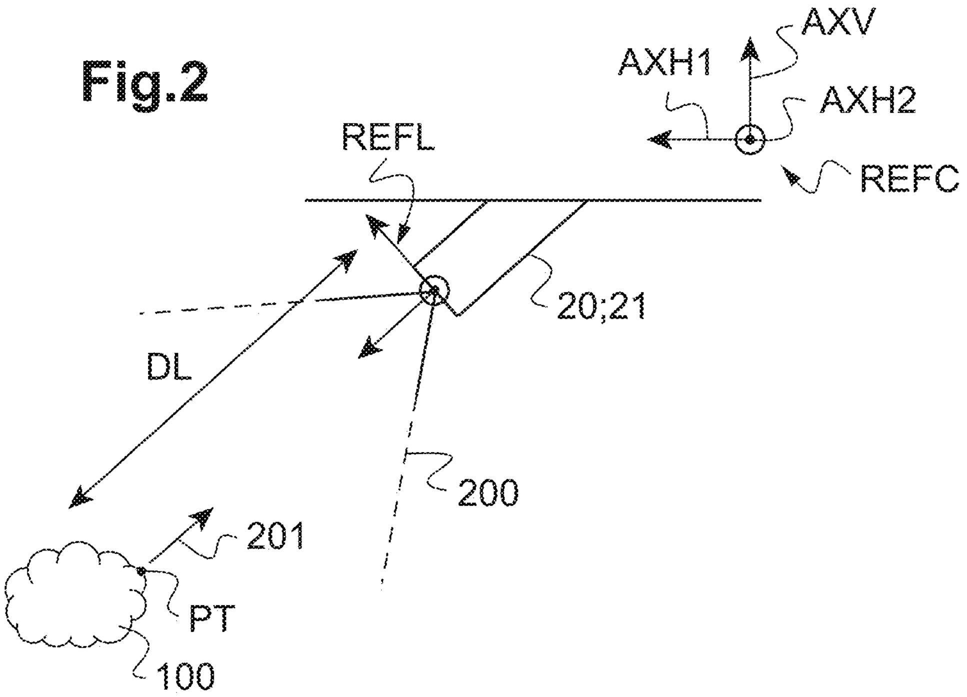
FIG. 2 is a diagram showing the mapping and obstacle sensor reference frames.

In reference to FIG. 2, when a light beam 200 impacts a point of an obstacle 100 referred to for convenience as "obstacle point PT", an echo 201 is reflected towards the obstacle sensor 21. From this, the obstacle sensor 21 deduces positioning data enabling the obstacle 100 to be located in the reference frame REFL of the obstacle sensor 21. This positioning data may comprise the distance DL separating the obstacle point from the obstacle sensor 21 and a bearing angle and an angle of elevation in the reference frame REFL of the obstacle sensor 21.

The controller 15 may be configured to plot the obstacle points in a mapping reference frame REFC. This mapping reference frame REFC may comprise two horizontal axes AXH1, AXH2 in the terrestrial reference frame and one vertical axis AXV vertical in the terrestrial reference frame.

Moreover, and in reference to FIG. 1, the controller 15 may be connected via a wired or wireless link to an inertial data sensing device 30. Such an inertial data sensing device 30 may comprise three gyroscopes for respectively determining a pitch angle, a roll angle and a yaw angle of the aircraft 1, and three accelerometers for respectively determining a pitch acceleration, a roll acceleration and a yaw acceleration of the aircraft 1. For example, such an inertial data sensing device 30 may comprise an inertial unit, or a system referred to as an "Attitude and Heading Reference System" or "AHRS".

Moreover, the controller 15 may be connected via a wired or wireless link to a speed sensing device 31. The speed sensing device 31 may comprise at least one sensor for determining a speed vector of the aircraft 1 in the mapping reference frame. For example, the speed sensing device 31 comprises a receiver of a satellite positioning device, a Doppler navigation system, an inertial unit, etc.

Moreover, the controller 15 is connected via a wired or wireless link to a display 25. This display means 25 may comprise a display means 26, such as a screen, a helmet visor, a glasses lens, a head-up collimator or the like.

The controller 15 may for example comprise a processing computer and a symbol generator computer within one or more processing units. The symbol generator computer may be integrated into the display means 25 or remote. According to one example, the display 25 and the symbol generator computer may form a single piece of equipment, the processing computer being a computer that may or may not be dedicated to the method of the disclosure.

Moreover, the controller 15 may be connected via a wired or wireless link to a human-machine selection interface 41 and/or a human-machine inhibition interface 42 and/or a human-machine adjustment interface 43. Each interface 41-43 may comprise conventional devices, that may be tactile or otherwise, enabling a pilot to transmit an analog or digital signal to the controller 15.

Irrespective of how the signaling system 10 is implemented, this signaling system 10 is configured to apply the signaling method of the disclosure.

Figure 3:
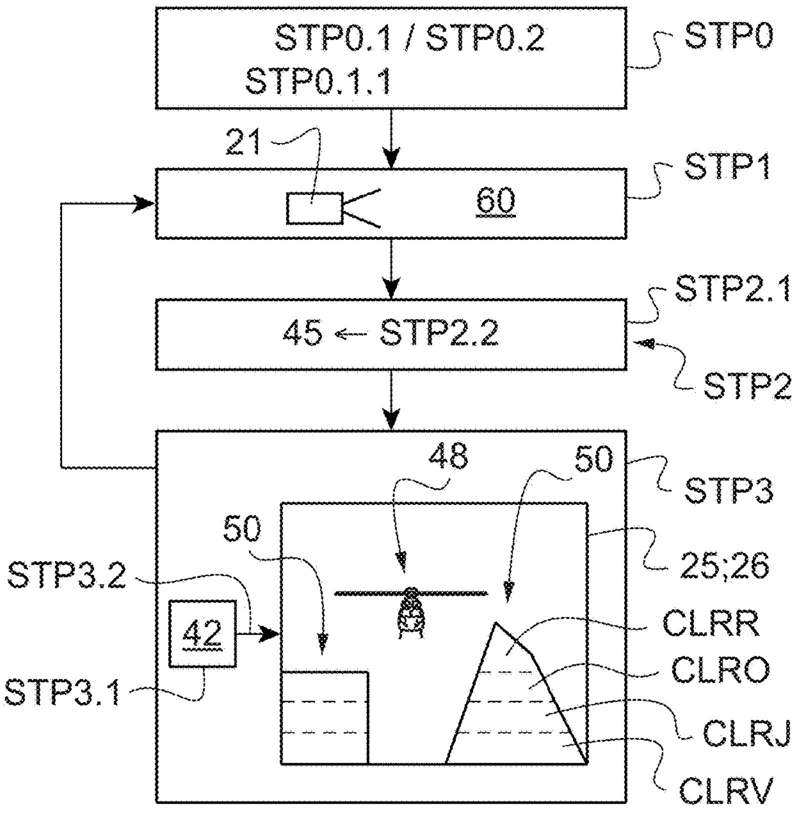
FIG. 3 is a diagram showing a signaling method according to the disclosure.

In reference to FIG. 3, the signaling method comprises an initialization step comprising the in-flight determination STP0 of the mapping reference frame REFC.

According to a first solution, the in-flight determination STP0 of a mapping reference frame REFC comprises the in-flight determination STP0.1 of a current roll angle and a current pitch angle of the aircraft 1, for example using the inertial data sensing device 30. This step next comprises the determination STP0.1.1 of the mapping reference frame REFC as a function of the reference frame REFL of the obstacle sensor 21 and the current roll angle and the current pitch angle, or indeed a mathematical model. For example, the controller 15 applies the mathematical model to determine the mapping reference frame REFC via a double rotation of the reference frame REFL of the obstacle sensor 21 about the roll axis of the aircraft according to the current roll angle, and about the pitch axis of the aircraft 1 according to the current pitch angle.

According to a second solution, the in-flight determination STP0 of a mapping reference frame comprises, during flight, positioning the aircraft in a predetermined attitude, then positioning STP0.2 the mapping reference frame REFC as a function of a current position of the reference frame REFL of the obstacle sensor 21 and a stored model by operating a human-machine selection interface. If there are several obstacle sensors, the reference frame REFL of one of the predetermined obstacle sensors 21 is used. For example, a pilot controls the aircraft 1 to place it in a position predetermined, i.e., with a roll angle and a pitch angle predetermined by the manufacturer. When the aircraft 1 is in the recommended position, the pilot operates the human-machine selection interface 41. This human-machine selection interface 41 transmits a digital or analog initialization signal to the controller 15. The controller 15 decodes it in a conventional manner and deduces from it the position of the mapping reference frame REFC by applying the stored model. Possibly, when the human-machine selection interface 41 is activated or the initialization signal is processed, the controller 15 considers that the reference frame REFL of the obstacle sensor 21 and the mapping reference frame REFC are the same.

The initialization phase possibly comprises displaying a predetermined background on the display 25.

Irrespective of the way wherein the mapping reference frame REFC is initialized, the signaling method comprises successive operating cycles carried out periodically during flight. At each operating cycle, the surrounding space 60 is scanned with the LiDAR obstacle sensor or sensors 21. This step comprises acquiring STP1 positioning data relating to the detected obstacle points. These positioning data are then received and decoded by the controller 15.

Following this acquisition, the signaling method 10 comprises constructing STP2, still during flight, a three-dimensional map 45 of said surrounding space 60 and positioning the aircraft 1 in the map 45 in its current position. The map 45 is established in the mapping reference frame REFC. Each point of the map 45 is positioned in relation to the center of this mapping reference frame REFC. During the flight, the map 45 is stored in a memory of the controller 15. The map 45 may be deleted after each flight or before each flight.

To this end, the controller 15 applies a simultaneous localization and mapping process STP2.1 or SLAM, at the very least using positioning data and the map 45 established during the previous operating cycle. Such a simultaneous localization and mapping process allows the map to be constructed and updated at each operating cycle.

Such a simultaneous localization and mapping process may conventionally comprise (a) a phase of pre-processing a current cloud of obstacle points comprising the obstacle points obtained during the current operating cycle, (b) an odometry phase to determine at least one transfer function between the current cloud of obstacle points and a cloud of obstacle points obtained during the previous operating cycle or from the map 45 established at the end of the previous operating cycle, for example using an algorithm referred to as the "Iterative Closest Point" or ICP algorithm, then (c) updating the map 45 to add the new obstacle points to the map 45 obtained during the previous operating cycle and to position the aircraft 1 in the new map 45 using the position reached during the previous operating cycle and said at least one transfer function.

Moreover, when constructing the map 45, the points of the map 45 that are far from the aircraft 1 can be removed, in order to reduce the resources required and facilitate the work of the controller 15. In this case, the signaling method may comprise removing STP2.2 from the map 45 each point situated at a distance from the aircraft greater than a predetermined threshold.

The "simultaneous localization and mapping" process may be that referred to as "Surfel-based mapping" and described, for example, in the document titled "Efficient Surfel-based Slam using 3D Laser Range Data in Urban Environments" by Jens Behley and Cyrill Stachniss.

Alternatively, the "simultaneous localization and mapping" process may be that referred to as the "Voxel grid method", and described, for example, in the document titled "Velodyne SLAM" by Frank Moosmann and Christoph Stiller, that can be consulted, for example, in "Proc. Of IEEE Intelligent Vehicles Symposium (IV)", pages 393-398, 2011.

During the first operating cycle, if the LiDAR obstacle sensor or sensors 21 detect a number of obstacle points less than a stored threshold, the method may possibly be completely restarted.

During the first operating cycle, the "simultaneous localization and mapping" process may possibly couple an odometry estimation algorithm with at least one piece of inertial data provided by the inertial data sensing device 30. The "simultaneous localization and mapping" process may possibly take into consideration the roll, pitch and yaw angles as well as the roll, pitch and yaw angular speeds and accelerations. For example, the inertial datum or data are used by the odometry estimation algorithm during the first operating cycle to obtain a more accurate initial estimate of the movement of the aircraft and, at the same time, a more accurate initial estimate of the translation-rotation transform or transforms.

During the second operating cycle and subsequent operating cycles, the odometry estimation algorithm may not take the inertial datum or data into consideration.

Moreover, the signaling method comprises displaying STP3, during flight and on the display 25, an aircraft symbol 48 showing the aircraft 1 in its current position and a representation 50 restricted to the display 25 of at least one part of the map 45 containing the aircraft 1. Said aircraft symbol 1 and said representation 50 may cover the background, if necessary.

Therefore, by default, the representation 50 shows all of the obstacles present in a part of the map 45, regardless of their altitude, and not only the obstacles present in a certain range of altitudes.

Furthermore, each point displayed in the representation 50 is shown according to a graphic charter that takes into consideration the level of risk the corresponding obstacle 100 presents to the aircraft 1. In particular, the level of risk varies as a function of an altitude of the associated obstacle point relative to an altitude of a reference of the aircraft 1. The controller 15 can easily determine the height separating an obstacle point and a horizontal plane passing through a reference connected to the aircraft 1, based on the position of the obstacle point and the aircraft 1 in the map 45.

According to the example shown, the obstacles 100 that are at an altitude substantially equal to or higher than the altitude of the aircraft 1 are displayed according to a first graphic code, for example in a red color CLRR. The obstacles 100 that are at an altitude slightly lower than the altitude of the aircraft 1 are displayed according to a second graphic code, for example in an orange color CLRO, the obstacles 100 that are at an altitude moderately lower than the altitude of the aircraft 1 are displayed according to a third graphic code, for example in a yellow color CLRJ, and the obstacles 100 that are at an altitude much lower than the altitude of the aircraft 1 are displayed according to a fourth graphic code, for example in a green color CLRV.

Figure 4:
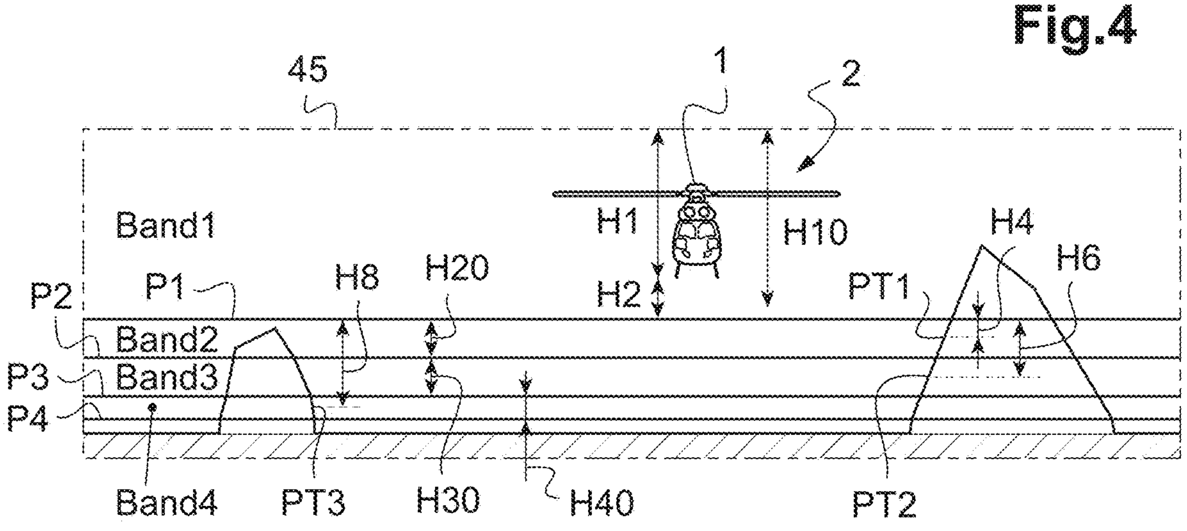
FIG. 4 is a diagram showing horizontal bands of the surrounding space associated with levels of risk according to the disclosure.

In reference to FIG. 4, the graphic code to be applied may depend on a minimum distance H4, H6, H8 between an obstacle 100 in the surrounding space 60 associated with this displayed point and a horizontal plane P1 in the terrestrial reference frame. This horizontal plane P1 is attached to the aircraft 1, for example being situated below the aircraft 1, for example at a distance H2 of two meters.

Moreover, the map 45 established during flight may be divided into several bands BAND1, BAND2, BAND3, BAND4. Each band is horizontal in the terrestrial reference frame and associated with a level of risk that is specific to it, and therefore with a graphic code that is specific to it.

Moreover, each band BAND1, BAND2, BAND3, BAND4 is delimited vertically by at least one horizontal plane P1, P2, P3 in the terrestrial reference frame. The first band BAND1 is delimited at least by the reference plane P1, and indeed by an optional upper plane situated above the horizontal plane. The other bands BAND2, BAND3, BAND4 extend between two parallel planes P1-P2, P2-P3, P3-P4 separated by a thickness H10, H20, H30, H40. The fourth band BAND4 may possibly comprise all of the space situated under the horizontal plane P3.

The controller 15 may locate at least one band as a function of a stored thickness of the band, and relative to the aircraft 1. Alternatively, the controller 15 may be configured to determine the thickness of at least one band as a function of a speed vector of the aircraft 1, determined using the speed sensing device 31, if necessary.

Furthermore, all of the displayed points of the representation 50 that are present in a given band are displayed visually according to the graphic code specific to this band.

For example, the level of risk associated with a point displayed in the representation 50 is at a maximum when this displayed point represents an obstacle 100 present in a first band BAND1 of the map 45 that is horizontal in the terrestrial reference frame and contains the aircraft 1. The first band may extend above the first plane P1, or between the first plane P1 and a second plane situated at a fixed or variable height H1 above the reference of the aircraft 1. As described previously, the points of the first band BAND1 may be a red color.

The level of risk associated with a point displayed in the representation 50 may be high when this displayed point represents an obstacle 100 present in a second band BAND2 of the map 45 that is horizontal in the terrestrial reference frame and adjacent to the first band BAND1, being below the first band BAND1. As described previously, the points of a second band BAND2 may be an orange color.

The level of risk associated with a point displayed in the representation 50 may be medium when this displayed point represents an obstacle 100 present in a third band BAND3 of the map 45 that is horizontal in the terrestrial reference frame and adjacent to the second band BAND2, being below the second band BAND2. As described previously, the points of a third band BAND3 may be a yellow color.

The level of risk associated with a point displayed in the representation 50 may be low when this displayed point represents an obstacle 100 present in a fourth band BAND4 of the map 45 that is horizontal in the terrestrial reference frame and adjacent to the third band BAND3, being below the third band BAND3. As described previously, the points of a fourth band BAND4 may be a green color.

Figure 5:
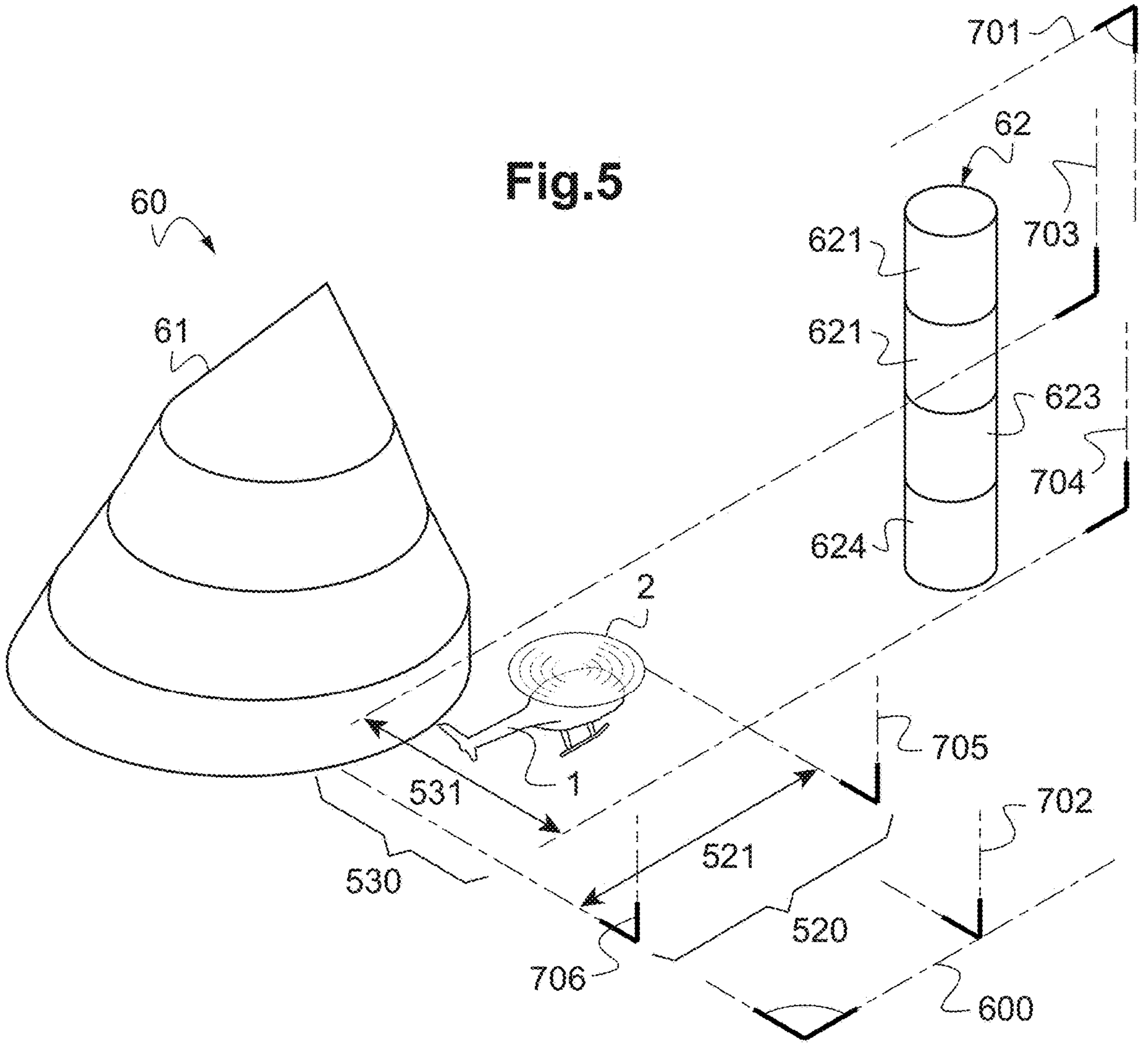
FIG. 5 is a diagram showing an aircraft in flight during the application of a signaling method according to the disclosure.

FIGS. 5 to 8 show the signaling method. FIG. 5 shows a map 45. This map 45 contains two obstacles 100, i.e., a mountain 61 and a cylindrical pylon 62. The map 45 may be virtually segmented according to the abovementioned convention using a half-space and 3 types of band. In particular, the pylon 62 contains one sector 621-624 in each band, and in particular one sector 621 present in the first maximum-risk band.

Figure 6:
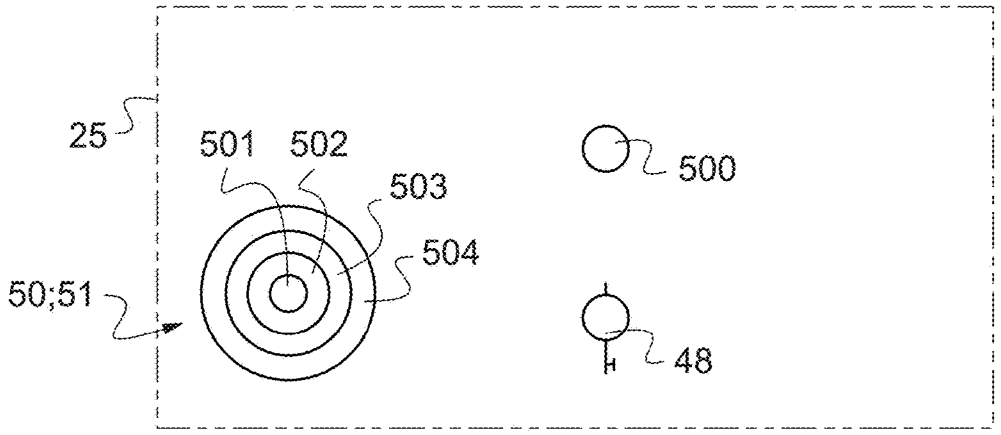
FIG. 6 is a diagram showing a display showing a top view representation of the surrounding space of FIG. 4.

In reference to FIG. 6, the representation 50 displayed on the display 25 may comprise a top view 51 according to a horizontal display plane 600 in the terrestrial reference frame. The controller 15 may be configured to project each point of the map 45 onto this horizontal display plane 600 in order to obtain an image displayed on the display 25.

Furthermore, and irrespective of the view, a point displayed in the representation 50 may correspond to at least two different obstacle points respectively associated with two different levels of risk. Viewed from above, a point of the representation 50 relative to the pylon 62 corresponds to all of the obstacle points of the pylon 62 that are present in a vertical segment. Therefore, the controller 15 displays this displayed point according to the graphic code of the highest level of risk of the levels of risk of the associated obstacle points. In other words, the representation 50 comprises a red circle 500 to show the pylon 62 of FIG. 5. The representation further comprises a circle 501 and rings 502, 503, 504 to show the mountain 61.

Figure 7:
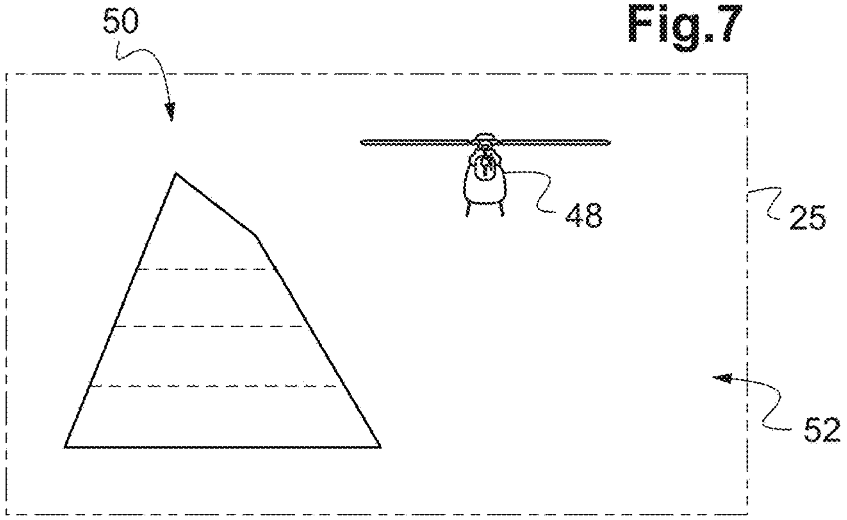
FIG. 7 is a diagram showing a display showing a rear view representation of the surrounding space of FIG. 4.
Figure 8:
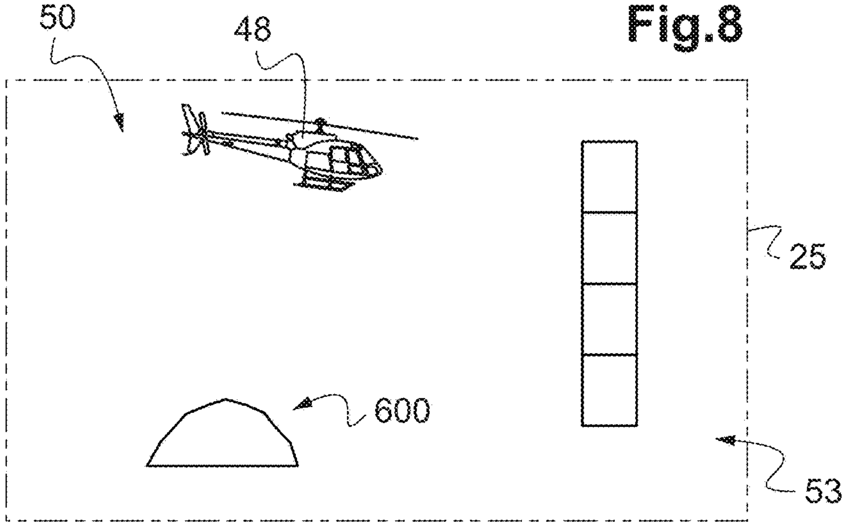
FIG. 8 is a diagram showing a display showing a side view representation of the surrounding space of FIG. 4.

According to FIGS. 7 and 8, the representation 50 is a view 52, 53 according to a vertical display plane 701, 702 in the terrestrial reference frame showing each obstacle point present in a section 520, 530 of the map 45 of FIG. 5 containing the aircraft 1, of a predetermined width 521, 531 between two vertical planes 705-706, 703-704 and restricted to the display 25. The controller 15 may be configured to project each point of the relevant section of the map 45, including the aircraft, onto this vertical display plane 701, 702 in order to obtain an image displayed on the display 25.

According to FIG. 7, the controller 15 may be configured to obtain a rear view of the aircraft 1. As the section 520 used to obtain this view does not contain the pylon 62, the representation does not contain an illustration of this pylon 62.

According to FIG. 8, the controller 15 may be configured to obtain a side view of the aircraft 1. As the section 530 used to obtain this view only contains part of the mountain 61, the representation only represents part 600 of this mountain 61.

If required, the pilot may possibly maneuver the human-machine adjustment interface 43 to select the view to be displayed, from a catalogue of views comprising a top view, a front or rear view according to FIG. 7 and a left or right side view according to FIG. 8.

Irrespective of the view, the method may comprise generating STP3.1 an inhibition order to inhibit each displayed point associated with a chosen level of risk, and inhibiting STP3.2 the display of the displayed points associated with the chosen level of risk, using the human-machine inhibition interface 42. A pilot may therefore remove all of the obstacles associated with one or more chosen levels of risk from the representation. At the very least, the obstacles associated with the maximum level of risk may be displayed permanently.

According to another aspect and one option possible, the signaling method may comprise, at each operating cycle, determining a confidence index relating to the simultaneous localization and mapping process. The controller may be configured to determine this confidence index and compare it to a predetermined criterion. The controller 15 can then control an alerter 27 to generate an alert when this confidence index does not comply with a predetermined criterion. The alerter may or may not be dedicated to this application, and capable of generating an audio, visual and/or tactile alert. The display 25 may possibly generate a said alert.

Figure 9:
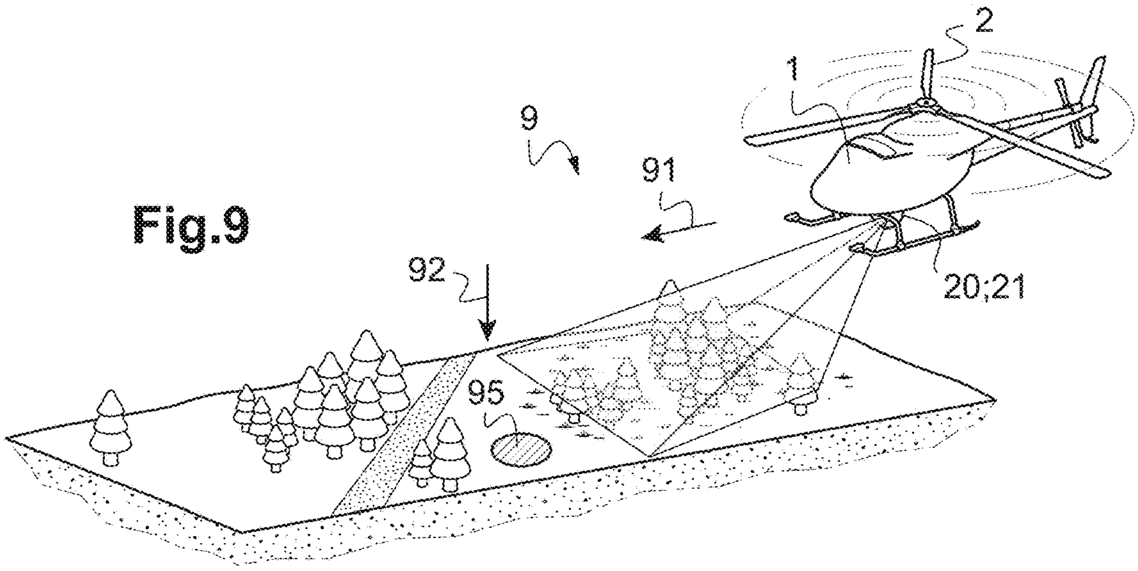
FIG. 9 is a diagram showing an approach method according to the disclosure.

FIG. 9 shows the approach method 90 for guiding an aircraft 1 towards a particular area 95 of the airspace, a landing or work area, for example. This approach method 90 comprises carrying out a preliminary phase 91 of flight over the particular area 95 wherein the signaling method 50 is implemented. The controller 15 therefore constructs the map 45 of the environment of the particular area 95. The approach method 90 then comprises carrying out a descent phase 92 towards the particular area 95 and applying the signaling method 50. The pilot can therefore view, on the display 25, the obstacles 100 detected during flight in the map 45 of the environment, in relation to the aircraft 1, as a function of their level of risk.

Naturally, the present disclosure is subject to numerous variations as regards its implementation. Although several embodiments are described above, it should readily be understood that it is not conceivable to identify exhaustively all the possible embodiments. It is naturally possible to replace any of the means described with equivalent means without going beyond the ambit of the present disclosure and the claims.

What is claimed is:

1. A signaling method for signaling, in an aircraft having at least one rotary wing, obstacles present in a surrounding space situated outside the aircraft, wherein the signaling method comprises an initialization comprising an in-flight determination of a mapping reference frame provided with a vertical axis in the terrestrial reference frame, and a series of operating cycles, each operating cycle comprising:

acquiring, with at least one LiDAR obstacle sensor of the aircraft, positioning data in a reference frame of the obstacle sensor, each positioning data relating to a position of an obstacle point present on an obstacle in the surrounding space in relation to the obstacle sensor;

constructing, using a controller of the aircraft, during the flight, a three-dimensional map of the surrounding space, and positioning the aircraft in the map, by applying a simultaneous localization and mapping process based at least on the positioning data, the map being generated in the mapping reference frame; and displaying, during the flight, on a display of the aircraft, an aircraft symbol showing the aircraft and a two-dimensional representation, restricted to the display, of at least a part of the map containing the aircraft and unlimited in altitude, each point displayed in the representation being associated with a level of risk that varies as a function of a relative altitude between an obstacle of the surrounding space associated with this displayed point and the aircraft, each displayed point of the representation being displayed according to a graphic charter taking the associated level of risk into consideration, wherein the aircraft symbol and the two-dimensional representation displayed on the display enable a pilot viewing the display to guide the aircraft during the flight to avoid an obstacle in the surrounding space.

2. The method according to claim 1, wherein the in-flight determination of a mapping reference frame comprises determining, during flight, a current roll angle and a current pitch angle of the aircraft, and determining the mapping reference frame as a function of the reference frame of the obstacle sensor and the current roll angle and the current pitch angle.

3. The method according to claim 1, wherein the in-flight determination of a mapping reference frame comprises, during flight, positioning the aircraft in a predetermined attitude, then positioning the mapping reference frame as a function of a current position of the reference frame of the obstacle sensor and a stored model by operating a human-machine selection interface.

4. The method according to claim 1, wherein the map is divided into several contiguous bands that are each horizontal in the terrestrial reference frame and associated with a level of risk, each point displayed in the representation associated with an obstacle present in one of the bands being visually displayed according to a graphic code specific to this band.

5. The method according to claim 4, wherein at least one band extends between two parallel planes separated by a distance that varies as a function of a speed vector of the aircraft.

6. The method according to claim 1, wherein the level of risk associated with a displayed point of the representation is at a maximum when this displayed point represents an obstacle present in a first band of the map that is horizontal in the terrestrial reference frame and contains the aircraft, this displayed point being visually different from any displayed point having a level of risk different from the maximum level of risk.

7. The method according to claim 6, wherein the level of risk associated with a displayed point of the representation is high when this displayed point represents an obstacle present in a second band of the map that is horizontal in the terrestrial reference frame and adjacent beneath the first band, the high level of risk being lower than the maximum level of risk, each displayed point associated with a maximum level of risk being visually different from each displayed point associated with a high level of risk.

8. The method according to claim 7, wherein (i) the level of risk associated with a displayed point of the representation is medium when this displayed point represents an obstacle present in a third band of the map that is horizontal in the terrestrial reference frame and adjacent beneath the second band, the medium level of risk being lower than the high level of risk, each displayed point associated with a medium level of risk being visually different from each displayed point associated with a high level of risk and a maximum level of risk; and (ii) the level of risk associated with a displayed point of the representation being low when this point represents an obstacle present in a fourth band of the map that is horizontal in the terrestrial reference frame and adjacent beneath the third band, the low level of risk being lower than the medium level of risk, each displayed point associated with a low level of risk being visually different from each displayed point associated with a maximum, high and medium level of risk.

9. The method according to claim 7, wherein, if a displayed point of the representation corresponds to at least two different obstacle points respectively associated with two different levels of risk, this displayed point has the highest level of risk of the levels of risk of the associated obstacle points.

10. The method according to claim 1, wherein the signaling method may comprise deleting each point of the map situated at a distance from the aircraft greater than a predetermined threshold.

11. The method according to claim 1, wherein the representation is a view according to a horizontal display plane in the terrestrial reference frame showing each obstacle point of the surrounding space restricted to the display.

12. The method according to claim 1, wherein the representation is a view according to a vertical display plane in the terrestrial reference frame showing each obstacle point present in a section of the surrounding space containing the aircraft, of a predetermined width and restricted to the display.

13. The method according to claim 1, wherein the method comprises generating an inhibition order to inhibit each displayed point associated with a chosen level of risk, and inhibiting the display of the displayed points associated with the chosen level of risk.

14. The method according to claim 1, wherein, during a first operating cycle of the series of operating cycles, the "simultaneous localization and mapping" process is configured to use, in an odometry estimation algorithm, at least one piece of inertial data.

15. The method according to claim 1, wherein the initialization comprises displaying a predetermined background on the display, the aircraft symbol and the representation covering the background.

16. The method according to claim 1, wherein the signaling method comprises, at each operating cycle, determining a confidence index relating to the simultaneous localization and mapping process, and generating an alert when this confidence index does not comply with a predetermined criterion.

17. The method according to claim 16, wherein the confidence index is calculated using at least one of the following factors: a stiffness of an inverse problem solved by an odometry estimation algorithm of the simultaneous localization and mapping process, a number of obstacle points detected during the current operating cycle that correspond to points of the map.

18. An approach method for guiding an aircraft having at least one rotary wing towards a particular area of the airspace, the approach method comprising:

carrying out a preliminary phase of flight of the aircraft over the particular area;

during this preliminary phase of flight, performing an initialization comprising an in-flight determination of a mapping reference frame provided with a vertical axis in the terrestrial reference frame, and a series of operating cycles, each operating cycle comprising:

acquiring, with at least one LiDAR obstacle sensor, positioning data in a reference frame of the obstacle sensor, each positioning data relating to a position of an obstacle point present on an obstacle in a surrounding space situated outside the aircraft in relation to the obstacle sensor; and constructing, during the preliminary phase of flight, a three-dimensional map of the surrounding space, and positioning the aircraft in the map, by applying a simultaneous localization and mapping process based at least on the positioning data, the map being generated in the mapping reference frame; and then carrying out a descent phase of flight of the aircraft towards the particular area; and during the descent phase of flight, positioning the aircraft in the map and displaying, on a display of the aircraft, an aircraft symbol showing the aircraft and a two-dimensional representation, restricted to the display, of at least a part of the map containing the aircraft and unlimited in altitude, each point displayed in the representation being associated with a level of risk that varies as a function of a relative altitude between an obstacle of the surrounding space associated with this displayed point and the aircraft, each displayed point of the representation being displayed according to a graphic charter taking the associated level of risk into consideration.

19. A signaling system configured for an aircraft having at least one rotary wing, for mapping and signaling obstacles present in a surrounding space, the signaling system comprising:

at least one LiDAR obstacle sensor;

a display; and a controller configured to perform an initialization comprising an in-flight determination of a mapping reference frame provided with a vertical axis in the terrestrial reference frame, and a series of operating cycles, each operating cycle comprising:

acquiring, with the at least one LiDAR obstacle sensor, positioning data in a reference frame of the at least one LiDAR obstacle sensor, each positioning data relating to a position of an obstacle point present on an obstacle in the surrounding space in relation to the at least one LiDAR obstacle sensor;

constructing, during the flight, a three-dimensional map of the surrounding space, and positioning the aircraft in the map, by applying a simultaneous localization and mapping process based at least on the positioning data, the map being generated in the mapping reference frame; and displaying, during the flight, on the display, an aircraft symbol showing the aircraft and a two-dimensional representation, restricted to the display, of at least a part of the map containing the aircraft and unlimited in altitude, each point displayed in the representation being associated with a level of risk that varies as a function of a relative altitude between an obstacle of the surrounding space associated with this displayed point and the aircraft, each displayed point of the representation being displayed according to a graphic charter taking the associated level of risk into consideration.

20. An aircraft having at least one rotary wing, wherein the aircraft comprises the signaling system according to claim 19.

* * * * *